United States Patent

Wolf et al.

[11] Patent Number: 6,064,198
[45] Date of Patent: May 16, 2000

[54] GEAR TOOTH SENSOR WITH IMPROVED RESOLUTION AND STABILITY

[75] Inventors: Ronald J. Wolf, Elkhart; Larry Hedeen, Howe, both of Ind.

[73] Assignee: Durakool, Inc., Elkhart, Ind.

[21] Appl. No.: 08/911,175

[22] Filed: Aug. 14, 1997

Related U.S. Application Data

[63] Continuation of application No. 08/510,419, Aug. 2, 1995, abandoned.

[51] Int. Cl.[7] .............................. G01B 7/14; G01B 7/30; G01R 33/025
[52] U.S. Cl. .................................. 324/207.2; 324/207.12; 324/207.25
[58] Field of Search ........................... 324/173, 174, 324/207.12, 207.2, 207.21, 207.25; 338/32 R, 32 H

[56] References Cited

U.S. PATENT DOCUMENTS

| | | |
|---|---|---|
| 3,900,814 | 8/1975 | Masuda . |
| 4,443,716 | 4/1984 | Avery ..................................... 324/207.2 |
| 4,481,469 | 11/1984 | Hauler et al. . |
| 4,626,781 | 12/1986 | Forkel ..................................... 324/174 |
| 4,700,133 | 10/1987 | Day . |
| 4,745,363 | 5/1988 | Carr et al. ....................... 324/207.25 X |
| 4,859,941 | 8/1989 | Higgs et al. .......................... 324/207.2 |
| 4,970,463 | 11/1990 | Wolf et al. ............................ 324/207.2 |
| 5,023,547 | 6/1991 | Pawlak et al. .......................... 324/174 |
| 5,250,925 | 10/1993 | Shinkle ................ 324/207.21 |
| 5,315,244 | 5/1994 | Griebeler ........................... 324/207.21 |
| 5,315,245 | 5/1994 | Schroeder et al. ................. 324/207.21 |
| 5,321,355 | 6/1994 | Luetzow ................ 324/207.2 |
| 5,332,965 | 7/1994 | Wolf et al. ......................... 324/207.12 |
| 5,341,097 | 8/1994 | Wu ....................................... 324/207.2 |
| 5,444,369 | 8/1995 | Luetzow . |
| 5,444,370 | 8/1995 | Wu ....................................... 324/207.2 |
| 5,469,052 | 11/1995 | Hulsing, II .............................. 324/174 |
| 5,510,708 | 4/1996 | Shirai et al. ............................ 324/174 |

*Primary Examiner*—Walter E. Snow
*Attorney, Agent, or Firm*—Katten Muchin Zavis

[57] ABSTRACT

A gear tooth sensor having increased sensitivity and temperature tolerance enables relatively small ferrous targets to be detected, which lends itself for use in relatively compact applications, such as the sensing of an automotive cam shaft drive wheel. All of the embodiments include a magnet having opposing north and south pole faces and a single input Hall effect IC which defines a sensing plane, and may include one or more flux concentrators. In one embodiment the sensor is configured such that the magnet is disposed adjacent the periphery of the target wheel such that the magnetic axis is generally parallel to the direction of travel of the ferrous target at an instant when the ferrous target is adjacent the magnet. In this embodiment, the Hall effect IC and flux concentrator are disposed adjacent one side of the ferrous target wheel and at least partially below the magnet. In one alternate embodiment of the invention, the magnet, Hall effect IC and flux concentrator are all aligned and disposed such that the magnetic axis is generally parallel to the direction of travel of the ferrous target at an instant when the ferrous target is adjacent the magnet. As such, the alternate embodiment is adapted to be configured relative to the ferrous target wheel for different applications. In both embodiments, additional flux concentrators can be included for adjusting the operate points of the Hall effect IC's. In yet other embodiments, the sensor is configured such that the sensing plane of the IC is generally perpendicular to the magnetic axis.

20 Claims, 5 Drawing Sheets

GEAR TOOTH SENSOR WITH IMPROVED RESOLUTION AND STABILITY

This application is a continuation of application Ser. No. 08/510,419 filed Aug. 2, 1995, now abandoned.

BACKGROUND OF THE INVENTION

1. Field of the Invention

The present invention relates to a gear tooth sensor and more particularly, to a gear tooth sensor having increased sensitivity and temperature tolerance which can detect relatively small ferrous targets over a relatively wide temperature range for use in relatively compact applications, such as sensing the rotation of an automotive cam shaft drive wheel.

2. Description of the Prior Art

Gear tooth sensors are generally known in the art. An example of such a gear tooth sensor is disclosed in U.S. Pat. No. 4,970,463, assigned to the same assignee as the present invention and hereby incorporated by reference. Such sensors normally include a magnetic flux responsive element, such as a Hall effect element, a magnet and may include one or more flux concentrators, all rigidly disposed adjacent one another. The configuration of such a sensor as in the '463 patent is such that an axis perpendicular to the opposing north and south pole faces of the magnet, hereinafter called a "magnetic axis", is generally perpendicular to the path of travel of the gear tooth on the ferrous target wheel at an instant when the target is adjacent the magnet. With such a configuration, the sensitivity of the sensor is relatively low, requiring relatively large ferrous targets for proper operation, which are generally not suitable in various compact applications, such as the sensing of rotation of an automotive cam shaft drive wheel. More particularly, in relatively compact applications, the distance between gullets (i.e. distance between adjacent teeth on a ferrous target wheel) is often limited to, for example, generally around 6 millimeters (mm). The sensor as disclosed in the '463 patent is not capable of sensing ferrous targets with such spacing between gullets on the ferrous target wheel.

In such compact applications, other known gear tooth sensors normally use a differential input magnetic flux sensitive element, such as an Allegro model No. 3056 integrated circuit (IC). Such differential IC's are normally about twice the size of a single input IC, such as Allegro model Nos. 3131 or 3134 single input IC's, normally used with gear tooth sensors of the type disclosed in the '463 patent. Thus, the cost of a differential IC is significantly higher than a single input IC.

In addition to being more expensive, there are problems with sensors which utilize such differential Hall effect IC's. For example, the Allegro model No. 3056 is normally formed on a relatively large die with two Hall effect sensitive arrays disposed adjacent to opposing ends of the die, for example, spaced 2 mm apart from center line to center line. The differential IC's use two (2) Hall effect elements which can experience about twice the temperature drift errors as an IC with a single Hall effect element.

There are other problems with known gear tooth sensors. In particular, known gear tooth sensors normally operate at a relatively large tolerance relative to the physical position of the gear tooth. For example, in an application where the sensor is used to indicate the passage of a target edge, such known sensors normally will not operate exactly at the target edge, but perhaps several degrees before or after the passing of the target edge; for example, ±2°. In many applications, such a relatively wide tolerance is unacceptable. In some applications, such as a cam shaft sensor, relatively narrower tolerances may be required, such as +or −1°. In such applications, such known gear tooth sensors would not be useful.

Another known problem with gear tooth sensors is that each gear tooth sensor is normally configured for a single application and is not adapted to be used in any other application. For example, as discussed above, the gear tooth sensor disclosed in the '463 patent is adapted to be used in only one application where the magnetic axis is generally perpendicular to the direction of travel of the ferrous target. The gear tooth sensor disclosed in the '463 patent is not adapted to be used in other applications, such as in applications where, due to the space constraints and specific geometry of the application in which the sensor is to be used, the magnetic axis would need to be generally parallel to the direction of travel of the ferrous target. As such, various known gear tooth sensors, such as the sensor disclosed in the '463 patent, have only limited utility. Thus, various customers and original equipment manufacturers (OEM) are required to purchase different sensors for each of their various applications.

SUMMARY OF THE INVENTION

It is an object of the present invention to provide a gear tooth sensor which solves various problems of the prior art.

It is another object of the present invention to provide a gear tooth sensor that is adapted to be utilized with relatively small ferrous targets.

It is yet another object of the present invention to provide a gear tooth sensor that is relatively inexpensive to manufacture.

It is yet a further object of the present invention to provide a gear tooth sensor for use in relatively compact applications.

It is yet a further object of the present invention to provide a gear tooth sensor which utilizes a single input Hall effect integrated circuit (IC).

It is another object of the present invention to provide a gear tooth sensor which has relatively narrower tolerances of the operate point relative to the passing of a gear tooth.

It is yet another object of the present invention to provide a gear tooth sensor which may be utilized in multiple applications.

Briefly, the present invention relates to a gear tooth sensor having increased sensitivity and temperature tolerance that enables relatively small ferrous targets to be detected, which lends itself for use in relatively compact applications, such as the sensing of an automotive cam shaft drive wheel. All of the embodiments include a magnet having opposing north and south pole faces and a single input Hall effect IC which defines a sensing plane, and may include one or more flux concentrators. In one embodiment the sensor is configured such that the magnet is disposed adjacent the periphery of the target wheel such that the magnetic axis is generally parallel to the direction of travel of the ferrous target at an instant when the ferrous target is adjacent the magnet. In this embodiment, the Hall effect IC and flux concentrator are disposed adjacent one side of the ferrous target wheel and at least partially below the magnet. In one alternate embodiment of the invention, the magnet, Hall effect IC and flux concentrator are all aligned and disposed such that the magnetic axis is generally parallel to the direction of travel of the ferrous target at an instant when the ferrous target is adjacent the magnet. As such, the alternate embodiment is adapted to be configured relative to the ferrous target wheel for different applications. In both embodiments, additional flux concentrators can be included for adjusting the operate points of the Hall effect IC's. In yet other alternate embodiments, the sensor is configured such that the sensing plane of the IC is generally perpendicular to the magnetic axis.

BRIEF DESCRIPTION OF THE DRAWING

These and other objects of the present invention will be readily understood with reference to the following specification and attached drawing, wherein.

DETAILED DESCRIPTION OF THE INVENTION

Figure 1:
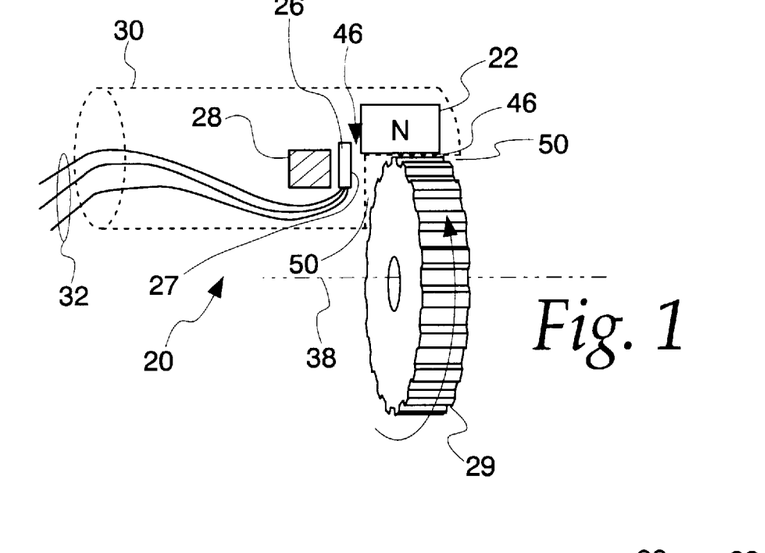
FIG. 1 is a perspective view of a gear tooth sensor in accordance with the present invention and a ferrous target wheel, shown with a sensor carrier shown in phantom.
Figures 2, 3:
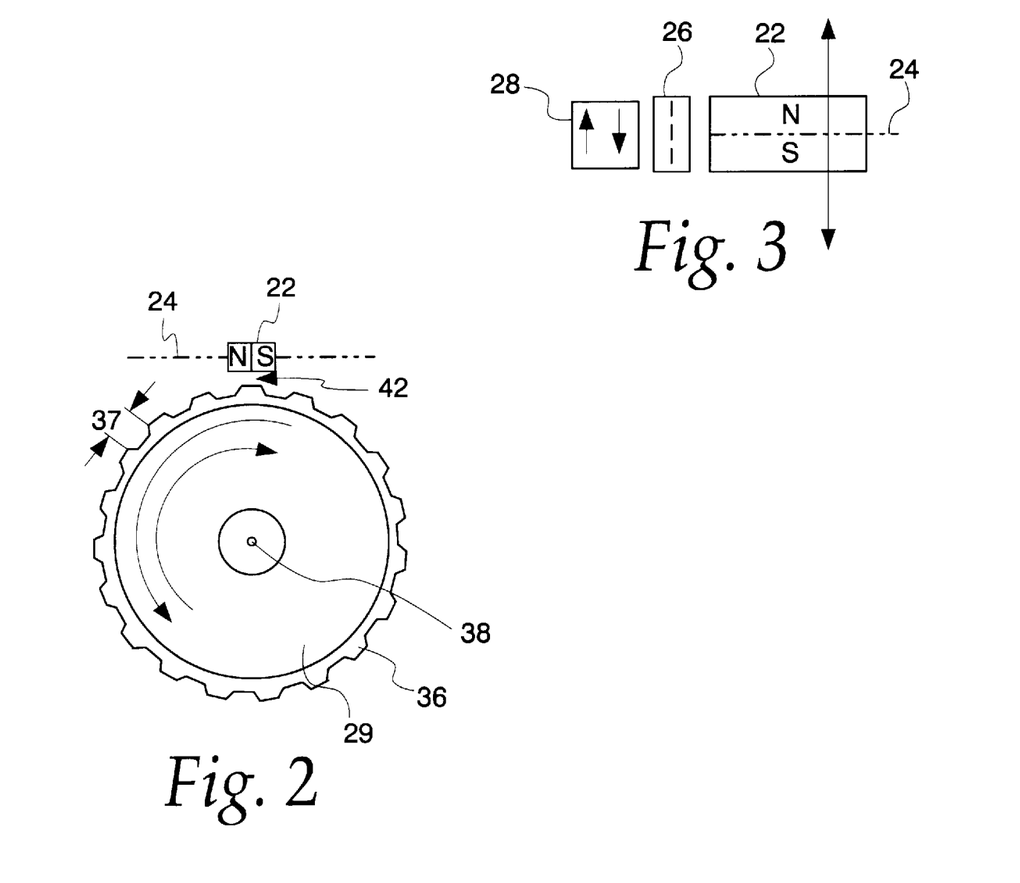
FIG. 2 is a front view of the gear tooth sensor illustrated in FIG. 1.
FIG. 3 is a bottom view of the gear tooth sensor illustrated in FIG. 1.

The gear tooth sensor, in accordance with the present invention, is generally identified with the reference numeral 20. Referring first to FIGS. 1–3, the gear tooth sensor 20 includes a magnet 22 having opposing north and south poles defining a magnetic axis 24 (FIG. 2) therebetween. The gear tooth sensor 20 also includes a magnetic flux responsive element 26 for providing an output signal as a function of magnetic flux, such as a single input Hall effect integrated circuit (IC) defining a sensing plane 27, for example, an Allegro model No. 3131 or model No. 3134 and a flux concentrator 28. Other magnetic flux responsive elements, such as a magneto-resistive elements (MRE), are also contemplated to be within the broad scope of the invention.

In the embodiment illustrated in FIGS. 1–3, the magnet 22 is disposed adjacent the periphery of a ferrous target wheel 29 such that the magnetic axis 24 is parallel to direction of travel of a ferrous target at an instant when the ferrous target is adjacent the magnet 22. The Hall effect IC 26 and the flux concentrator 28 are disposed adjacent one side of the ferrous target wheel 29 such that the sensing plane 27 of the magnetic flux responsive element 26 is generally parallel therewith. The Hall effect IC 26 and flux concentrator 28 are also disposed to be at least partially below the bottom plane of the magnet 22. The magnet 22, magnetic flux responsive element 26 and flux concentrator 28 are carried by a suitable carrier 30. The Hall effect IC 26 normally includes three electrical leads, generally identified with the reference numeral 32, for connection to an external electrical circuit (not shown). These electrical leads 32 may be brought out any convenient location of the carrier 30.

As shown best in FIGS. 1 and 2, the gear tooth sensor 20 is adapted to be utilized with a ferrous target wheel 29 having a plurality of gear teeth 36. As mentioned above, the gear tooth sensor 20 is adapted to be utilized with relatively small or fine ferrous targets, such as the teeth 36. For example, the ferrous target wheel 29 may be formed to have a diameter of about 110 mm and an axial width of 14 mm. The teeth 36 may be formed to have a height of about 5 mm and a distance 37 between adjacent teeth (i.e. gullet distance) of about 6 mm.

It should be understood by those of ordinary skill in the art that the principles of the present invention are applicable to such relatively fine tooth target wheels as described above and various other configurations as well. For example, as shown, the ferrous target wheel 29 is shown with a plurality of contiguous gear teeth 36, shown about the periphery of the ferrous target wheel 29. In some applications, particularly automotive applications, the target wheel 29 may be formed with a single target, for example at the 12 o'clock position, perhaps two contiguous gear teeth 36 at the 3 o'clock position and three contiguous gear teeth at the 6 o'clock position to provide an indication of the angular position of the ferrous target wheel 34. The principles of the present invention are clearly applicable to such a configuration and to virtually any configuration.

As shown in FIGS. 1 and 2, the magnet 22 is configured such that its magnetic axis 24 is generally perpendicular to the axis of rotation 38 of the ferrous target wheel 29 and generally parallel to the direction of travel of the ferrous target wheel 29 at an instant when the ferrous target 36 is adjacent the magnet 22. An important aspect of the invention is that the gear tooth sensor 20 allows a relatively small and inexpensive magnet 22 to be used. For example, the magnet 22 may be a rare earth magnet, such as a Samarium cobalt or neodymium magnet, formed as a 4 mm cube or perhaps a 4×4×6 mm cube having a typical energy product of about 26 million Gauss-Oersteds.

The magnet 22 is disposed at a fixed air gap 42 (FIG. 2) relative to the gear teeth 36. An air gap of roughly between 0.38 and 1.8 mm is suitable. The Hall effect IC 26 is disposed such that its sensing plane 27 is generally perpendicular to the axis of rotation 38 of the ferrous target wheel 34 and disposed adjacent one side of the ferrous target wheel 29 and at least partially below the bottom surface of the magnet 22. As best shown in FIG. 1, the Hall effect IC 26 is disposed at a predetermined axial clearance 46 relative to one side of the ferrous target wheel 29. The axial clearance 46 of the Hall effect IC 26 relative to the ferrous target wheel 29 is preferably about in the range from 0.75 mm to about 1.25 mm. Too great of an axial clearance 46 may cause degradation of the performance of the gear tooth sensor 20.

As mentioned above, the gear tooth sensor 20 may be provided with one or more flux concentrators 28. The flux concentrators 28 are preferably formed from a soft magnetic material, such as low-carbon steel. As shown, the flux concentrator 28 is disposed adjacent the Hall effect IC 26, adjacent a side of the ferrous target wheel 29. The configuration of the flux concentrator 28 relative to the Hall effect IC 26 and magnet 22 may be maintained by the carrier 30. Alternatively, the flux concentrator 28 can be rigidly secured to the Hall effect IC 26 with a suitable adhesive, such as an epoxy, prior to being configured within the carrier 30. All such configurations are contemplated to be within the broad scope of the present invention.

The flux concentrator 28 is shown with a generally rectangular cross-sectional configuration. However, other configurations of flux concentrators are contemplated to be within the broad scope of the present invention. For example, cylindrical flux concentrators (not shown) with a generally circular cross-section, are contemplated, as well as L-shaped and various other configurations, for example as shown in the '463 patent, hereby incorporated by reference.

In addition to improving the response of the gear tooth sensor 20, the flux concentrator 28 also enables the sensitivity of the gear tooth sensor 20 to be adjusted. More particularly, with reference to FIG. 3, the position of the flux concentrator 28 relative to the Hall effect IC 26 can be moved in the direction of the arrows 48 as shown in FIG. 3. By moving the flux concentrator 28 relative to the Hall effect 26, the operate and release points for the Hall effect IC 26 can be calibrated. Alternatively, the position of the Hall effect IC 26 can be varied in a vertical direction (FIG. 3) in the same manner as the flux concentrator 28. More particularly, as best shown in FIG. 2, the Hall effect IC is normally located in a vertical plane generally perpendicular to the axis of rotation 38 of the ferrous target wheel 29 and at least partially below the bottom surface of the magnet 22. In the alternative form of sensitivity adjustment, the Hall effect IC would simply be moved from left to right (FIG. 2) relative to the flux concentrator 28, while remaining in the same vertical plane. In another alternate form of sensitivity adjustment of the sensor illustrated in FIG. 2, the magnet 22 can be moved left or right while maintaining the position of the Hall effect IC 26 and its flux concentrator 28.

The carrier 30 may be formed from any non-magnetically conductive material, such as plastic, in a generally cylindrical shape with a notch 50 for receiving the ferrous target wheel 29 as shown in phantom in FIG. 1. The gear tooth sensor 20 may also be potted with any suitable potting compound, such as epoxy.

The configuration of the gear tooth sensor 20, in accordance with the present invention and as will be discussed below, provides acceptable output signals over a relatively wide temperature range, for example from −40° C. to +150° C. It enables relatively small gear teeth 36 to be sensed, which enables the gear tooth sensor to be utilized in relatively compact applications, such as an automotive cam shaft sensor or an anti-lock braking (ABS) wheel speed sensor. In addition, the use of the a gear tooth sensor 20 provides additional benefits in that it enables the use of a relatively small magnet 22 and a single input Hall effect IC 26, such as an Allegro model No. 3131 or model No. 3134, which reduces the overall cost of the sensor.

Figures 4, 5, 6:
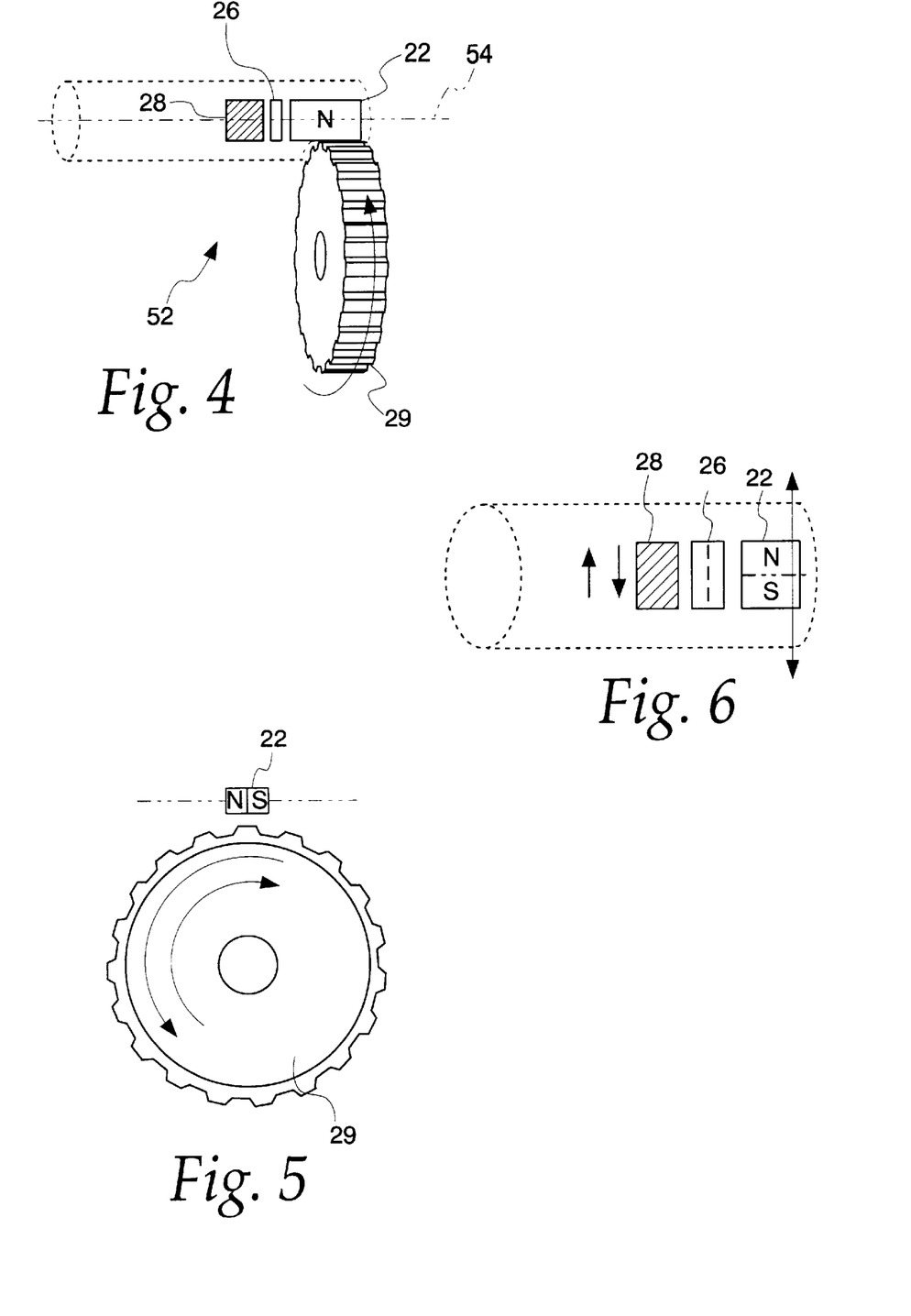
FIG. 4 is a perspective view of an alternative embodiment of the gear tooth sensor illustrated in FIG. 1, shown in a first configuration relative to a ferrous target wheel.
FIG. 5 is a front view of the gear tooth sensor and ferrous target wheel illustrated in FIG. 4.
FIG. 6 is a bottom view of the gear tooth sensor and ferrous target wheel illustrated in FIG. 4, shown with the carrier in phantom.
Figures 7, 8, 9:
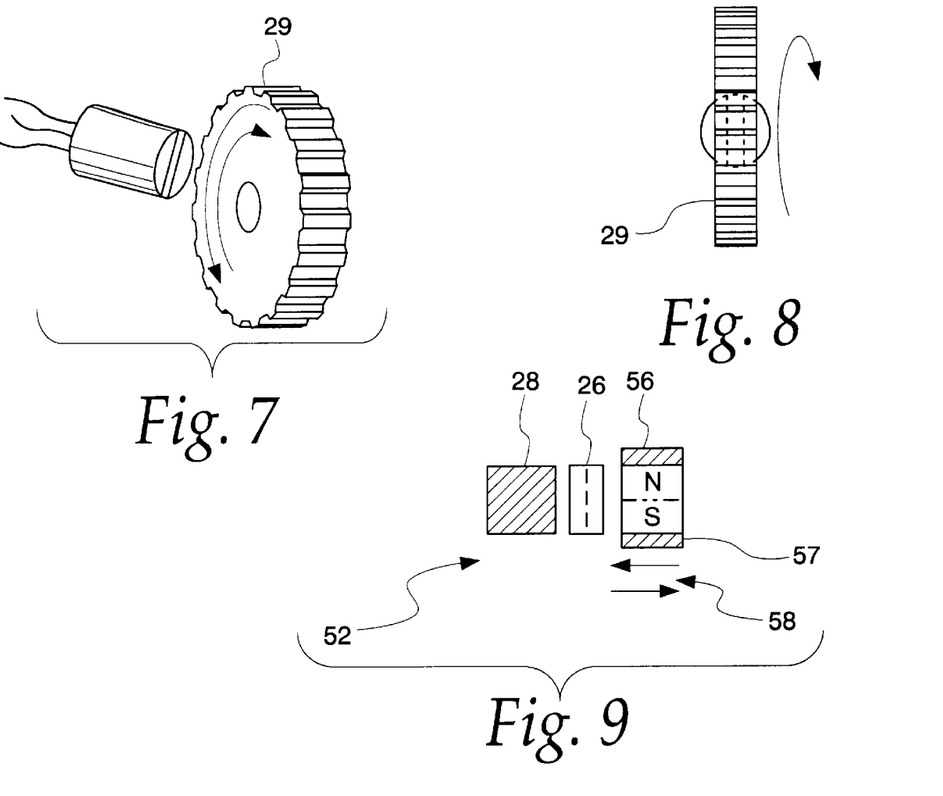
FIG. 7 is a perspective view of the gear tooth sensor illustrated in FIG. 4, shown in a second configuration relative to the ferrous target wheel.
FIG. 8 is an end view of the gear tooth sensor and ferrous target wheel illustrated in FIG. 7.
FIG. 9 is a bottom view of the gear tooth sensor illustrated in FIG. 4, shown with a pair of flux concentrators disposed adjacent the magnet.

An alternate embodiment of the gear tooth sensor is illustrated in FIGS. 4–6. The alternative embodiment gear tooth sensor, identified with the reference numeral 52, utilizes like components as the gear tooth sensor 20 illustrated in FIGS. 1–3 and thus are identified with like reference numerals. The essential difference in the embodiment illustrated in FIGS. 4–6 is the configuration of the Hall effect IC 26 and the flux concentrator 28 relative to the magnet 22. In the embodiment illustrated in FIGS. 4–6, the magnet 22, Hall effect IC 26 and flux concentrator 28 are aligned, as generally shown in FIG. 4, with the Hall effect IC 26, sandwiched between the magnet 22 and the flux concentrator 28. An important advantage of the alternative gear tooth sensor 52 is that it is adapted to be utilized in different configurations and configured such that the magnetic axis 24 of the magnet 22 is parallel to the direction of travel of the ferrous target 36 at an instant when the ferrous target 36 is adjacent the magnet 22. Such a configuration enables the gear tooth sensor 52 to be utilized in an application wherein a longitudinal axis 54 of the sensor 52 is generally parallel to the axis of rotation 38 of the ferrous target wheel 29 as shown in FIGS. 4–6. Alternatively, as shown in FIGS. 7 and 8, the gear tooth sensor 52 can also be used in applications where the longitudinal axis 54 of the gear tooth sensor 52 is generally perpendicular to the axis of rotation 38 of the ferrous target wheel 34. Such a gear tooth sensor 52 thus provides additional flexibility and cost savings for users since the same gear tooth sensor 52 can be used in different applications as shown in FIGS. 4–8.

As mentioned above, the sensitivity of both the gear tooth sensor 20, illustrated in FIGS. 1–3, and the gear tooth sensor 52, illustrated in FIGS. 4–9, can be adjusted by adjusting the position of the flux concentrator 28 relative to the Hall effect IC or by maintaining the position of the flux concentrator 28 while varying the position of the Hall effect IC 26 along the magnetic axis 24 of the magnet 22. Alternatively, the magnet 22 can be moved right and left (FIG. 2) while the Hall effect IC 26 and its associated flux concentrator 28 remain stationary for sensitivity adjustment.

As illustrated in FIG. 9, additional flux concentrators 56 and 57 can be added to the opposing pole faces of the magnet 22. The sensitivity of the sensor 52 with the flux concentrators 56 and 57 is adjusted by moving the position of the flux concentrators 56 in the direction of the arrows 58 (FIG. 9).

Figure 10:
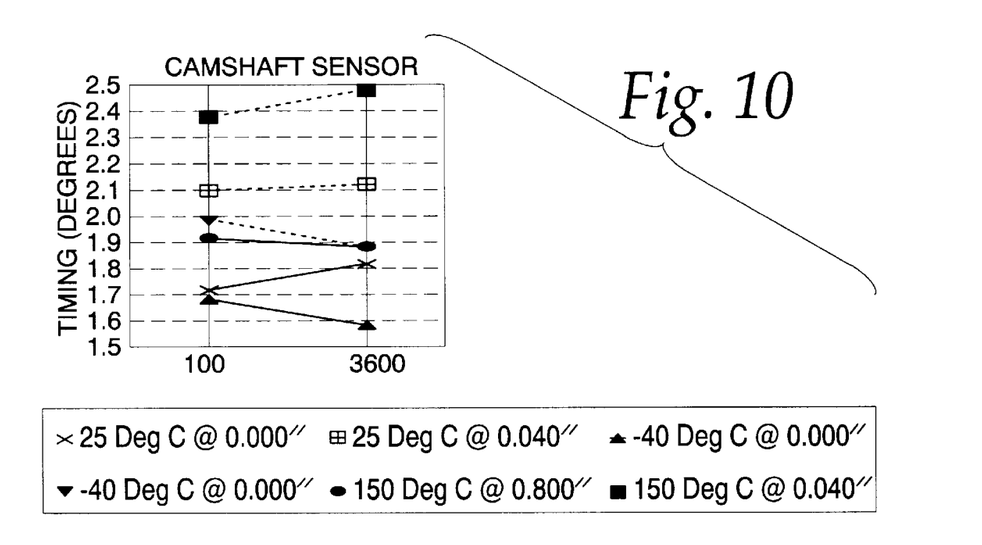
FIG. 10 is a graphical illustration of the operate points of the sensor in accordance with the present invention relative to the tooth position at varying temperatures, air gaps and RPM's.

As discussed above, the performance of the gear tooth sensor 20 also provides relatively good performance over a relatively wide temperature range within an angular tolerance of less than 1° as generally illustrated in FIG. 10. As mentioned above, the angular tolerance relates to the actuation of the sensors 20 and 52 relative to the passing of a gear tooth 36 on the ferrous target wheel 29. As shown in FIG. 10, the angular tolerance varies less than 1° over a relatively wide temperature range and at varying air gaps 42 between 0.0 and 1.0 mm. The sensors 20 and 52 also showed good performance at different revolutions per minute (RPM) of the ferrous target wheel 29.

Figure 11:
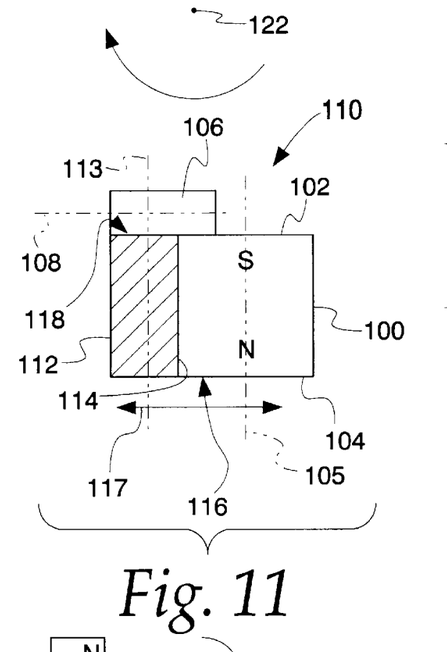
FIG. 11 is an elevational view of an alternate embodiment of the invention.
Figure 12:
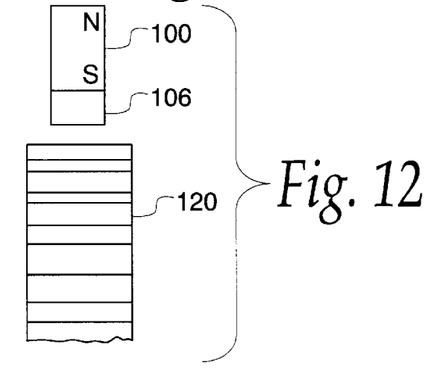
FIG. 12 is a plan view of the alternate embodiment illustrated in FIG. 11.
Figure 13:
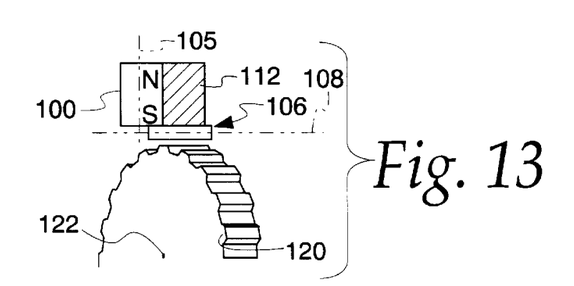
FIG. 13 is similar to FIG. 11 but additionally illustrates a ferrous target wheel.
Figure 14:
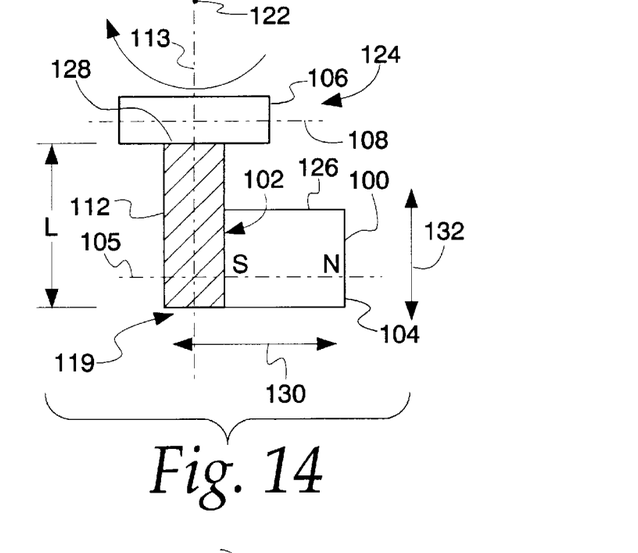
FIG. 14 is an elevational view of another alternate embodiment of the invention.
Figure 15:
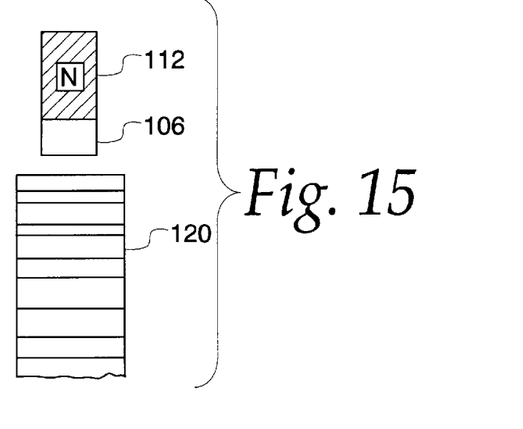
FIG. 15 is a plan view of the alternate embodiment illustrated in FIG. 14.
Figure 16:
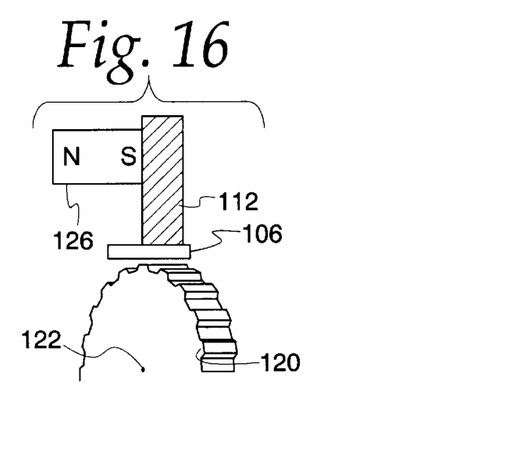
FIG. 16 is similar to FIG. 14 but additionally illustrates a ferrous target wheel.
Figure 17:
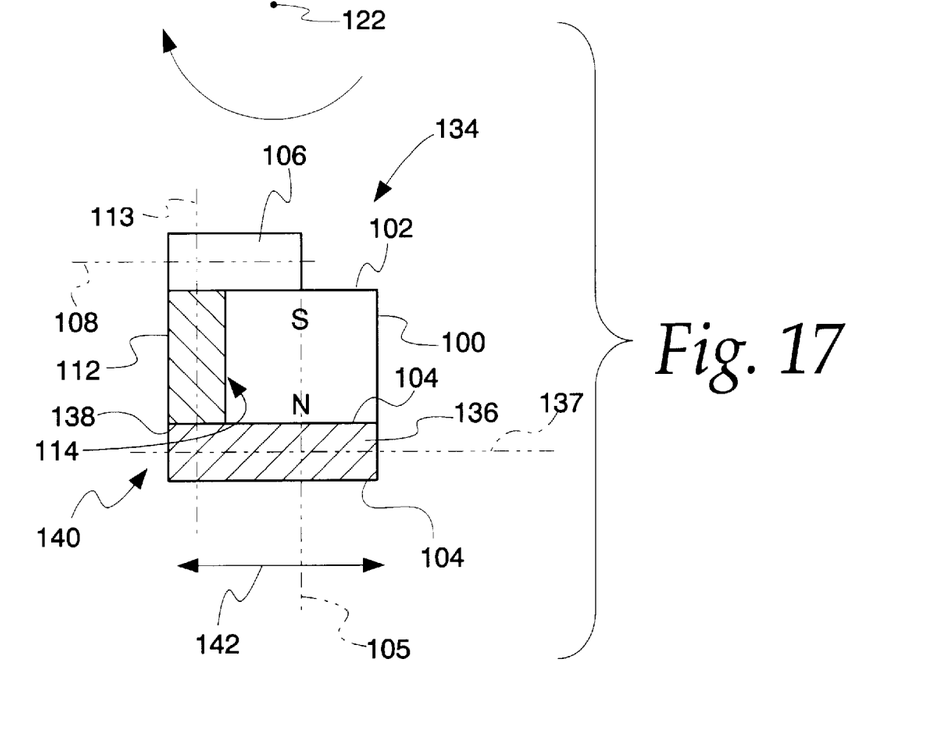
FIG. 17 is an elevational view of yet another alternate embodiment of the invention.

Alternate embodiments of the invention are illustrated in FIGS. 11–18. More particularly, a first alternate embodiment is illustrated in FIGS. 11–13, while a second alternate embodiment is illustrated in FIGS. 14–16. A third alternate embodiment is illustrated in FIG. 17. In each of the embodiments, a magnetic flux responsive element, such as a Hall effect device, is disposed relative to a magnet such that in a non-excited state (i.e. no gear tooth present), the sensing plane of the magnetic flux responsive element is disposed in a field that is essentially below the required Gauss level for turn-on. For example, with reference to FIG. 18, a magnet 100 is illustrated with opposing pole faces 102 and 104. As shown, magnetic flux emanates from the north pole face 104 and returns to the south pole face 102, defining a magnetic axis 105 therebetween.

Figure 18:
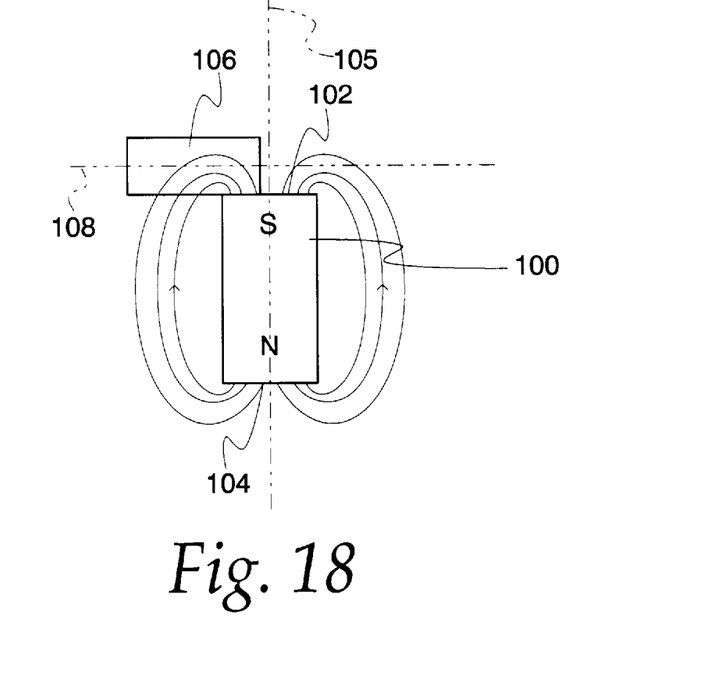
FIG. 18 is similar to FIG. 11, shown with the magnetic flux lines and shown without a flux concentrator.

A magnetic flux responsive element 106, such as a Hall effect device, as discussed above, is positioned such that its sensing plane 108 is generally perpendicular to the magnetic axis 105 and a portion of the magnetic flux responsive element 106 partially overlaps one or the other of the north and south pole faces 104 and 102, respectively. The amount of overlap is determined by adjustment.

With the configuration as illustrated in FIG. 18, the sensing plane 108 of the magnetic flux responsive element 106 is generally subject to a flux level less than the turn-on level when no target is present, even though the magnetic flux responsive element 106 partially overlaps one of the north and south pole faces 104 and 102, respectively. More particularly, the vertical components of magnetic flux at the location generally illustrated in FIG. 18 of the magnetic flux responsive element 106 are less than when a target is present. Indeed, during a condition when no gear tooth is present, the sensing plane 108 of the magnetic flux responsive element 106 is primarily subjected to horizontal components of the magnetic flux lines. By so positioning the magnetic flux responsive element 106, the presence of a ferrous target, such as a gear tooth, will shunt the flux lines in such a manner to cause the sensing plane 105 of the magnetic flux responsive element 106 to be subject to substantial vertical components relative to the sensing plane 108 in the presence of a ferrous object, such as a gear tooth.

Three embodiments of the invention which follow the general principles of operation of FIG. 18 are contemplated. The first embodiment, illustrated in FIGS. 11–13 and generally identified with the reference numeral 110, is similar to FIG. 18 and includes a magnet 100 having opposing north and south pole faces 104 and 102, which defines a magnetic axis 105 therebetween. A magnetic flux responsive element 106 is provided such that its sensing plane 108 is disposed generally perpendicular to the magnetic axis 105 and such that the magnetic flux responsive element 106 partially overlaps one or the other of the respective north and south pole faces 104 and 102, respectively. In this embodiment 110, a flux concentrator 112, formed from, for example, a soft magnetic material, is rigidly disposed relative to a lateral surface 114 of the magnet 100. The flux concentrator 112 may be formed in a generally rectangular shape defining a longitudinal axis 113 and formed with a rectangular cross-section.

The combination of the flux concentrator 112 and magnet 100 form a sub-assembly 116. The magnetic flux responsive element 106 is disposed to at least partially overlap a top surface 118 of the flux concentrator 112, as well as partially overlap one or the other of the opposing north and south pole faces 104 and 102; respectively, of the magnet 100 forming the assembly 110. The assembly 110 is then disposed relative to a ferrous target, such as a gear tooth wheel 120 having an axis of rotation 122 (FIGS. 11 and 12), such that the magnetic axis 105 of the magnet 100 and the longitudinal axis 113 of the flux concentrator 112 are generally perpendicular to the axis of rotation 122 and the sensing plane 108 of the magnetic flux responsive element 106 is generally parallel to the axis of rotation 122. The subassembly 116 is then moved in the direction of the arrow 117 for adjustment.

An alternate embodiment of the invention is illustrated in FIGS. 14–16. This embodiment of the invention, generally identified with the reference numeral 124, is similar to the embodiment illustrated in FIGS. 11–13; except in the embodiment 124, the magnet 100 is configured such that its magnetic axis 105 is generally parallel to the sensing plane 108 of the magnetic flux responsive sensor 106. As such, in the embodiment 124, the magnetic axis 105 is generally parallel to the sensing plane 108 and generally perpendicular to the longitudinal axis 113 of the flux concentrator 112. The magnetic axis 105 is generally perpendicular to the axis of rotation 122 while the sensing plane 108 is generally parallel to the axis of rotation 122.

In this embodiment, the flux concentrator 112 is disposed adjacent one or the other of the opposing north and south pole faces 104 and 102, respectively. In addition, the flux concentrator 112 may be sized such that its length extends beyond a top surface 126 of the magnet 100. In this embodiment, the magnetic flux responsive element 106 is disposed adjacent a top surface 128 of the flux concentrator 112 and spaced apart from the top surface 126 of the magnet 100.

The arrows 130 and 132 indicate the method for adjusting the sensor assembly 124. In particular, the combination of the magnet 100 and the flux concentrator 112 forming a subassembly 119 may be moved along the direction of the arrows 130 to provide a relatively coarse adjustment of the operate and release points for the sensor. In addition, the magnet 100 may be moved in the direction of the arrows 132 relative to the flux concentrator 112 to provide a relatively fine adjustment.

A third embodiment of the sensor assembly is illustrated in FIG. 17 and identified with the reference numeral 134. The assembly 134 is similar to the assembly 110 illustrated in FIGS. 11–13 and includes an additional flux concentrator 136, similar to the flux concentrator 112, disposed adjacent one pole face, that is opposite the pole face partially overlapped by the magnetic flux responsive element 106. As shown in FIG. 17, the flux concentrator 136 is disposed adjacent the north pole 104 and may extend beyond the lateral surface 114 of the magnet 100 as shown and may at least partially overlay a bottom surface 138 of the magnetic flux concentrator 112. In such a configuration, a longitudinal axis 137 of the second flux concentrator 136 is generally parallel to the sensing plane 108 and the axis of rotation 122 of ferrous target wheel 120 (FIGS. 11 and 13) while generally perpendicular to the magnetic axis 105 and the longitudinal axis 113 of the other flux concentrator 112.

In this embodiment, the magnet 100 and flux concentrators 112 and 136 form a sub-assembly 140. The subassembly 140 is moved in the direction of the arrows 142 relative to the magnetic flux responsive element 106 to adjust the operate and release points of the sensor assembly 134.

The sensor assemblies illustrated in FIGS. 11–18 are zero speed sensors similar to the sensors illustrated in FIGS. 1–8. However, the sensors illustrated in FIGS. 11–19 offer specific advantages over those illustrated and described in FIGS. 1–8. In particular, the sensor assemblies illustrated in FIGS. 11–18 are essentially OMNI-directional in the sense that the sensor assemblies 110, 122 and 134 can sense a ferrous target, such as a gear tooth, in any direction and can sense a ferrous target at zero speed on power-up. The sensor assemblies illustrated in FIGS. 1–8 are responsive to ferrous targets in only a single direction. In addition, the sensors illustrated in FIGS. 11–18 are responsive to gear teeth having smaller gullets. More particularly, the sensor assemblies illustrated in FIGS. 11–18 are responsive to gear teeth having gullets as small as, for example, 2 mm, while the sensor assemblies illustrated in FIGS. 1–8 require a gullet size of about 5 mm or greater. Such a characteristic enables the sensor assemblies illustrated in FIGS. 11–18 to respond to relatively smaller ferrous target wheels which, in turn, can be used in fairly compact applications.

For the embodiments illustrated in FIGS. 11–18, exemplary dimensions of the flux concentrators 112 and 136 are about 4.3×5×2 mm. The magnet 100 may be the same as discussed above or even smaller, for example, 26 Mega Gauss-Oersteds. The magnetic sensing element may be a single input Hall effect IC as discussed above. In addition, an MRE, as well as any of the other magnetic flux responsive elements as disclosed in U.S. Pat. No. 4,970,463, hereby incorporated by reference, are contemplated. In such embodiments, the magnetic flux responsive elements are positioned such that their sensing planes, as defined in the '463 patent, are positioned as discussed above.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is: I claim:

1. A gear tooth sensor for sensing one or more gear teeth on a ferrous target wheel, said target wheel being rotatably mounted relative to a predetermined axis of rotation, the sensor comprising:
   a magnet for generating magnetic flux having opposing north and south magnetic pole faces defining a lateral surface therebetween and a magnetic axis generally perpendicular to said opposing pole faces of said magnet;
   a single magnetic flux responsive element which provides an output signal as a function of said magnetic flux, said magnetic flux responsive element having a predetermined sensing plane that is sensitive to said magnetic flux
   a first flux concentrator at least partially disposed in a plane generally parallel to said magnetic axis and at least partially disposed adjacent to said lateral surface; and
   a carrier for carrying said magnet and said magnetic flux responsive element relative to said ferrous target wheel such that said magnet is disposed at a predetermined air gap relative to the periphery of said ferrous target wheel and said magnetic flux responsive element is offset from said center line of said magnet forming a zero speed sensor, said magnetic flux responsive element being disposed to at least partially overlap one of said opposing pole faces of said magnet.

2. A gear tooth sensor as recited in claim 1, wherein said magnetic flux responsive element is a predetermined Hall effect integrated circuit (IC).

3. A gear tooth sensor as recited in claim 2, wherein said predetermined Hall effect IC is a predetermined single input IC.

4. A gear tooth sensor as recited in claim 1, further including means for adjusting the sensitivity of said magnetic flux responsive element.

5. A gear tooth sensor as recited in claim 4, wherein said adjusting means includes a predetermined flux concentrator.

6. A gear tooth sensor as recited in claim 1, wherein said magnetic flux responsive element is carried by said carrier such that said sensing plane is generally perpendicular to the axis of rotation of said ferrous target wheel.

7. A gear tooth sensor as recited in claim 6, wherein said magnetic flux responsive element is carried by said carrier such that a portion of said sensing plane is adjacent a lateral surface of magnet, adjacent opposing pole faces.

8. A gear tooth sensor as recited in claim 5, wherein said flux concentrator is disposed adjacent said magnetic flux responsive element.

9. A gear tooth sensor as recited in claim 5, wherein said flux concentrator is disposed adjacent one of said north and south pole faces.

10. A gear tooth sensor as recited in claim 9, further including another flux concentrator disposed adjacent to the other of said north and south pole faces.

11. A gear tooth sensor as recited in claim 1, wherein said carrier is adapted to carry said magnet such that said magnetic axis is parallel to the direction of travel of a gear tooth when said gear tooth is adjacent said magnet.

12. A sensor for sensing one or more ferrous targets, the sensor comprising:
   a magnet for generating magnetic flux having opposing north and south magnetic pole faces defining a lateral surface therebetween and a magnetic axis generally perpendicular to said opposing pole faces of said magnet;
   a first flux concentrator at least partially disposed in a plane generally parallel to said magnetic axis and at least partially disposed adjacent to said lateral surface; and
   a single magnetic flux responsive element which provides an output signal as a function of said magnetic flux, said magnetic flux responsive element having a predetermined sensing plane responsive to said magnetic flux, wherein said magnetic flux responsive element is offset from said centerline of said magnet forming a zero speed proximity sensor, said magnetic flux responsive element being disposed to at least partially overlap one of said opposing pole faces of said magnet.

13. The sensor as recited in claim 12, further including a second flux concentrator.

14. The sensor as recited in claim 12, wherein said first flux concentrator is configured in a generally L shape.

15. The sensor as recited in claim 13, wherein said second flux concentrator is configured in a generally rectangular shape.

16. The sensor as recited in claim 15, wherein said second flux concentrator is disposed in a plane generally perpendicular to said magnetic axis and disposed adjacent one of said opposing magnetic pole faces.

17. The flux concentrator as recited in claim 1, further including a second flux concentrator.

18. The sensor as recited in claim 1, wherein said first flux concentrator is configured in a generally L shape.

19. The sensor as recited in claim 17, wherein said second flux concentrator is configured in a generally rectangular shape.

20. The sensor as recited in claim 19, wherein said second flux concentrator is disposed in a plane generally perpendicular to said magnetic axis and disposed adjacent one of said opposing magnetic pole faces.

* * * * *